United States Patent [19]

Greene et al.

[11] 4,249,398
[45] Feb. 10, 1981

[54] METHOD AND APPARATUS FOR PROCESSING HEAT-SOFTENABLE FIBER FORMING MATERIAL

[75] Inventors: Neil E. Greene, Granville; Seshadri Srinivasan, Pickerington, both of Ohio

[73] Assignee: Owens-Corning Fiberglas Corporation, Toledo, Ohio

[21] Appl. No.: 12,521

[22] Filed: Feb. 16, 1979

[51] Int. Cl.$^3$ ............................................. C03B 37/02
[52] U.S. Cl. ............................................. 65/1; 65/2; 65/11 W; 65/356
[58] Field of Search ................... 65/1, 2, 11 W, 11 R, 65/356

[56] References Cited

U.S. PATENT DOCUMENTS

| | | | |
|---|---|---|---|
| 3,331,673 | 7/1967 | Bour | 65/2 X |
| 3,492,104 | 1/1970 | Glaser | 65/2 X |
| 3,905,790 | 9/1975 | Strickland | 65/2 |
| 3,985,530 | 10/1976 | Hynd | 65/1 |
| 4,161,396 | 7/1979 | Greene et al. | 65/1 |

Primary Examiner—Robert L. Lindsay, Jr.
Attorney, Agent, or Firm—Ronald C. Hudgens; Philip R. Cloutier; Kenneth H. Wetmore

[57] ABSTRACT

Method of, and apparatus for, processing heat-softened fiber-forming material comprising a bushing block. The bushing block has a wall defining a passage for accommodating flow of heat-softened material from a supply into a fiber-forming bushing. The bushing block further includes insulating means comprising an insulating space surrounding the wall and a radiation shield surrounding the insulating space.

19 Claims, 9 Drawing Figures

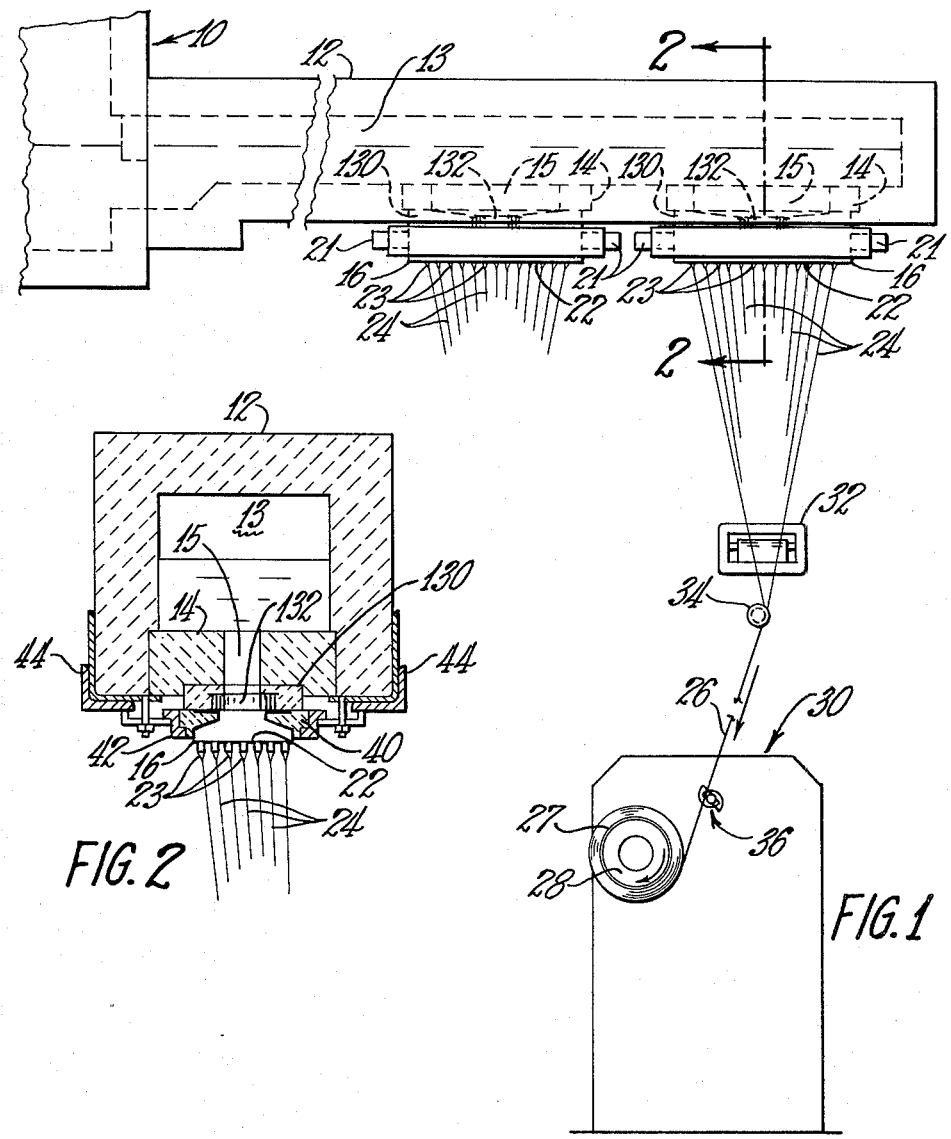

4,249,398

METHOD AND APPARATUS FOR PROCESSING HEAT-SOFTENABLE FIBER FORMING MATERIAL

TECHNICAL FIELD

The invention relates to a method of, and apparatus for, processing heat-softened mineral material, such as glass, wherein the heat-softened glass is conveyed from a forehearth channel or other supply of glass into a stream feeder or bushing through a flow passage or passage means in a bushing block. The bushing block is figured to efficiently and effectively transfer the glass from the forehearth into a bushing in a manner to more effectively utilize heat, to render the glass more thermally uniform, and to improve bushing performance.

BACKGROUND OF THE INVENTION

It has been conventional practice in methods or processes of attenutating glass streams flowing from orifices in a stream feeder or bushing into fibers or filaments to utilize a bushing block of refractory disposed between the forehearth and the stream feeder or bushing. Such bushing blocks are generally a solid piece of refractory material and conventionally have a rectangle shaped opening or passing elongated lengthwise of the bushing through which glass from the forehearth flows.

SUMMARY OF THE INVENTION

The present invention comprises a bushing block for use in the production of fibers such as glass fibers. The bushing block comprises a wall defining a passage for accommodating the flow of heat-softened material from a supply into a fiber forming bushing and an insulating means comprising an insulating space surrounding the wall and a radiation shield surrounding the space.

The present invention also comprises an apparatus for processing heat-softened fiber forming mineral material. The apparatus comprises means containing a supply of heat-softened material, a bushing disposed adjacent said means and a bushing block disposed between the bushing and the supply of heat-softened material. The bushing has orifices through which streams of materials are discharged. The bushing block comprises a wall defining a passage for accommodating the flow of heat-softened material from the supply into the bushing and insulating means comprising an insulating space surrounding the wall and a radiation shield surrounding the space.

The present invention further comprises a method of processing heat-softened mineral material. The method comprises establishing a body of material for delivery into a bushing having orifices through which material flows from the bushing, thermally isolating the material in the bushing from the body of material by a bushing block, flowing the material from the bushing through the orifices as fine streams and concomitantly flowing material from the body into the bushing through a passage in the bushing block defined by a wall. The method further comprises insulating the passage by providing a space surrounding the wall and a radiation shield surrounding the space.

An object of the invention is an improved method of, and apparatus for, conveying glass from a forehearth or other supply of heat-softened glass through a passage or passages in a bushing block into a stream heater or bushing in a manner to effect conservation of heat and render more stable a process of attenuating streams of glass to fibers for filaments.

Another object of the invention is to provide an improved bushing block.

These and other objects of the invention will become more apparent as the invention is described hereinafter in detail with reference to the accompanying drawings.

DESCRIPTION OF THE DRAWINGS

FIG. 1 is a semi-schematic elevational view of a forehearth and bushing arrangement embodying one form of bushing block of the invention associated with each bushing.

FIG. 2 is a vertical sectional view taken substantially on the line 2—2 of FIG. 1.

DESCRIPTION OF THE PREFERRED EMBODIMENTS

Figure 3:
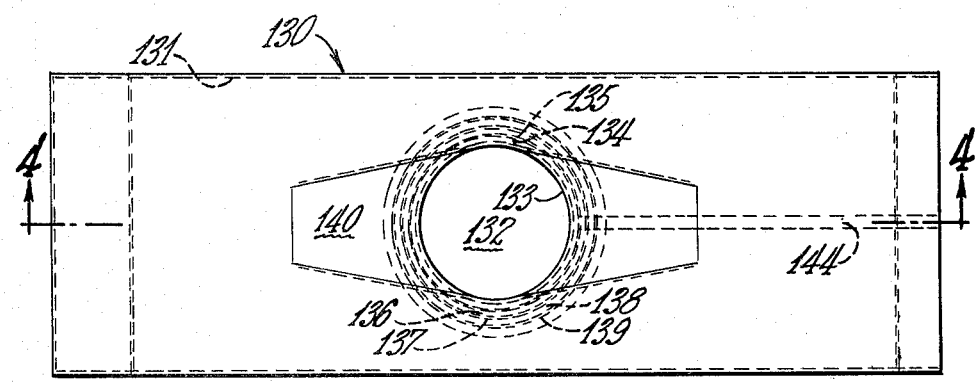
FIG. 3 is a top plan view of one form of bushing block construction of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the method and apparatus of the invention has particular utility in the processing of glass for forming fibers or filaments from streams of glass, it is to be understood that the method and apparatus may be employed for processing other fiber forming mineral materials.

Referring to the drawings in detail, FIG. 1 illustrates a melting furnace and a forehearth construction for supplying heat-softened refined glass to stream feeders or bushings associated with the forehearth. Glass batch is melted and refined in a furnace or tank 10. Forehearth 12 is connected with the melting and refining furnace. The forehearth has a channel 13 containing heat-softened refined glass flowing from the furnace. The glass in the forehearth channel is maintained at the proper temperature by conventional heating means (not shown).

The glass is processed in the furnace and forehearth to render it suitable for attenuation into filaments or fibers. Associated with the forehearth are one or more stream feeders or bushings 16 of hollow rectangular configuration, there being two bushings shown in FIG. 1. The forehearth floor adjacent each bushing is provided with a flow block 14 having a lengthwise elongated glass flow passage 15 of conventional construction. Disposed between each bushing 16 and adjacent flow block 14 is bushing block 130 having glass flow passage 132 and flow passage insulating means. Passages 15 and 132 accommodate flow of heat-softened glass from the forehearth channel into a bushing. The bushing block will be hereinafter described in detailed.

Each of the bushings is fashioned of an alloy of platinum and rhodium or other suitable material capable of withstanding the high temperature of molten glass and is provided with terminals 21 at the ends connected with a supply of electrical current for maintaining a desired temperature of the glass. Floor 22 of each bushing is provided with orifices through which flow streams 23 of glass which are attenuated to filaments 24 by winding a strand 26 of the filaments upon a forming tube 27 mounted upon a rotatable collet 28 of a winding machine 30 of conventional construction.

While one winding machine 30 is illustrated in FIG. 1, it is to be understood that a winding machine is provided for winding a strand of filaments attenuated from a group of streams of glass from each of the bushings. An applicator such as applicator 32 may be provided for each group of filaments for delivering size or coating material onto the filaments. The filaments of each group are converged into a strand 26 by a gathering shoe or member 34.

During winding of strand 26 upon forming tube 27 mounted on a rotatable collet 28, a rotatable and reciprocal traversing means 36 of conventional construction engages the strands for distributing the strand lengthwise on the forming tube to form a package in a conventional matter. Each bushing is surrounded or embraced by refractory material 40, as shown in FIG. 2. The refractory material, the bushing block and the bushing are supported by members 42 secured to a frame or support means 44 of the forehearth.

Bushing block 130 functions to thermally isolate the bushing from the forehearth. In prior constructions, a bushing block has been fashioned of solid refractory material. The bushing block of the present invention is of a new construction.

Figure 4:
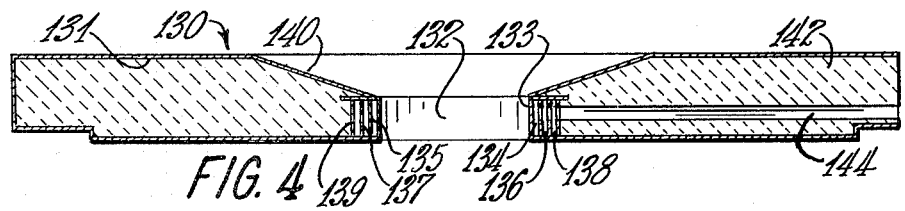
FIG. 4 is a longitudinal sectional view taken substantially on the line 4—4 of FIG. 3.

FIGS. 3 and 4 show bushing block 130 in more detail. As shown, the bushing block has a circular glass flow passage 132 defined by wall 133. The bushing block is provided with a sloped portion 140 adapted so that glass flowing through a generally rectangularly-shaped flow passage of a flow block is guided from the flow block passage to the circular bushing block passage. To thermally insulate passage 32, bushing block 130 is provided with insulating spaces 134, 136, and 138 formed by radiation shields 135, 137 and 139. Space 134 surrounds wall member 133. Radiation shield 135 surrounds gap 134 and similarly gap 136 surrounds radiation shield 135. Radiation shield 137 surrounds gap 136 and similarly gap 138 surrounds radiation shield 137. Radiation shield 139 surrounds gap 138 and this radiation shield is surrounded by refractory material 142. As shown, flow passage 132 has a circular shape and the three radiation shields each having a progressively larger circular shape. The bushing block is provided with a surface coating or supporting wall 131 in which refractory material 142 is positioned.

The insulating spaces and radiation shields surrounding the flow passage provide improved and controlled thermal isolation of the heat-softened glass flowing through the passage. To reduce conduction of heat, as compared to a conventional solid refractory bushing block, insulating spaces containing air or other gases which have a low thermal conductivity or containing an evacuated space are provided surrounding the passage. To reduce radiation of heat, radiation shields such as reflective metallic shields of, for example, a platinum, rhodium alloy are provided surrounding the insulating spaces. The number of spaces or gaps and the size of the gaps can be different depending upon the desired amount of heat transfer from the glass while it flows through the passage.

Pressure relief hole or channel 144 provides open communication of the insulating spaces with the outside atmosphere. The air or other gas expands in the insulating spaces during heating of the bushing block during operation and can be released to the atmosphere through the channel. It is also within the scope of the invention that relief channel 144 can be used to evacuate the insulating spaces surrounding the flow channel by means of a pump or other conventional means. Once the spaces have been evacuated, the relief channel can be plugged as the problem of gas expansion during heat up of the bushing block is eliminated.

Figure 5:
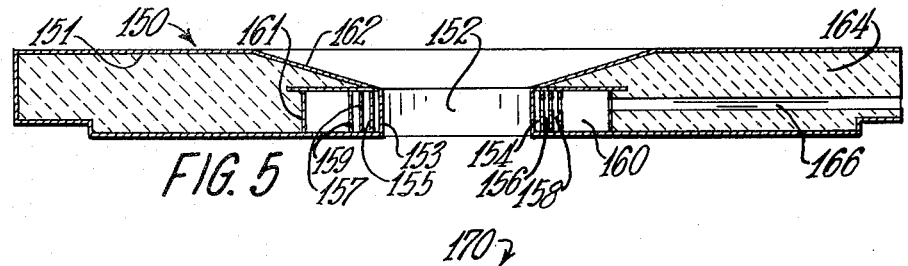
FIG. 5 is a longitudinal sectional view of another bushing block configuration.

FIG. 5 shows another embodiment of a bushing block configuration. Bushing block 150 is provided with circular flow passage 152 defined by wall 153. The bushing block has sloping surface 162 to guide the heat-softened material from the flow block to the flow passage in the bushing block. This particular bushing block configuration provides four air gaps and four radiation shields. As can be seen, the insulating spaces or air gaps surrounding the flow channel are of different configurations. Spaces 154, 156, and 158 are generally equal in size and space 160 is much larger in size than any of the other spaces. The desired size and number of insulating spaces depends upon the desired amount of heat transfer from the glass flowing through the passage. Radiation shields 155, 157, 159, and 161 each have a circular shape. The four insulating spaces in this configuration are all in open communication with the atmosphere through holes in the radiation shields and tube 166. Refractory material 164 is placed inside the bushing block frame 151 to add structural integrity to the bushing block. The radiation shields and the wall defining the flow passage are constructed of materials which are resistant to high temperature. For example, the radiation shields and the wall can be made of a platinum-rhodium alloy or of a ceramic material.

Figure 6:
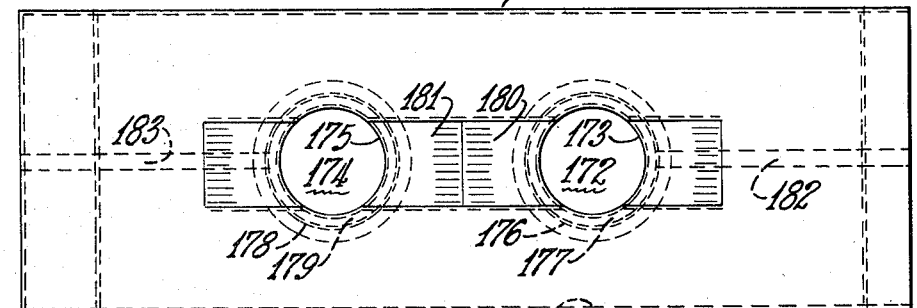
FIG. 6 is a top plan view of a bushing block embodying two glass flow passages.

FIG. 6 shows another embodiment of the invention. The bushing block 170 is provided with two flow passages, 172 and 174. These flow passages are defined by walls 173 and 175, respectively. Guide means 180 and 181 guide the material from a forehearth or some other supply to the two flow passages. Each flow passage is provided with an insulating means comprising insulating spaces and radiation shields. Circular wall 173 is surrounded by insulating space 177, and that space is surrounded by circular radiation shield 176. In a like manner, circular wall 175 is surrounded by insulating space 179, and that space is surrounded by radiation shield 178. The spaces 177 and 179 are provided with air relief channels 182 and 183, respectively. The bushing block 170 is provided with surface 171 and refractory material therein.

Figure 7:
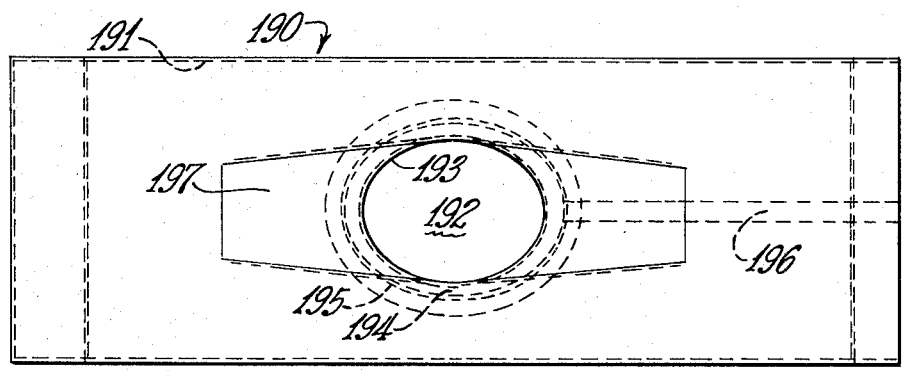
FIG. 7 is a top plan view of a bushing block illustrating a glass flow passage of oval configuration.

FIG. 7 shows another embodiment of the invention. Bushing block 190 is provided with wall 193 defining flow passage 192 having an oval cross-sectional shape. The oval wall is surrounded by insulating space 194, and that space is surrounded by radiation shield 195. The insulating space or air gap is provided with a relief path 196 to the atmosphere. The bushing block is provided with guide surface 197 to guide the heat-softened material to the oval passage. The bushing is also provided with a surface 191 in which refractory material is placed for structural support.

Figure 8:
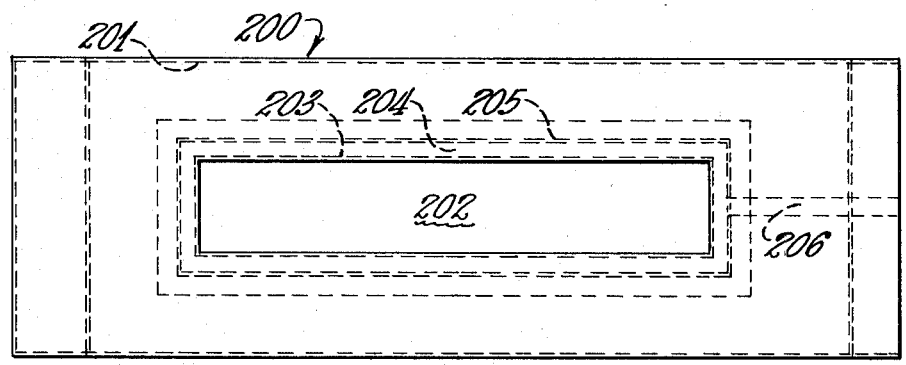
FIG. 8 is a top plan view of a bushing block illustrating a glass flow passage of rectangular configuration.

FIG. 8 illustrates another bushing block embodiment. Bushing block 200 comprises wall member 203 which defines passage 202 which has a rectangular cross section. Surrounding the wall member is an insulating space or air gap 204. Surrounding the space is radiation shield 205 which has a rectangular cross section. The air space is in communication with the atmosphere through path 206. As with the other embodiments, it is within the scope of the invention to have the insulating space evacuated and path 206 blocked rather than have the space filled with air or some other gas and path 206 in open communication with the atmosphere.

Figure 9:
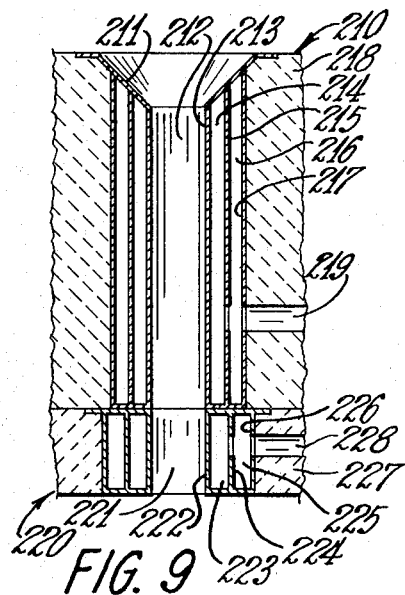
FIG. 9 is longitudinal sectional view illustrating a flow block and bushing block having registering flow passages of substantially the same configuration.

FIG. 9 illustrates a bushing block in combination with a flow block.

Flow block 210 comprises flow passage 212 defined by wall 213. The flow block has guide surface 211 for guiding heat-softened material from supply into the flow block passage. Surrounding the circular passage is insulating space 214. The insulating space is surrounded by a circular radiation shield 215. In a like manner, insulating space 215 surrounds radiation shield 215, and radiation shield 217 surrounds insulating space 216. Refractory material 218 is shown in contact with the outer radiation shield. The insulating spaces or air gaps are in open communication with the atmosphere through relief path 219.

Bushing block 220 comprises flow channel 221 defined by wall 222. In a similar manner as described above for the flow block, the bushing block passage is surrounded by two insulating spaces 223 and 225 and two radiation shields 224 and 226. The insulating spaces or air gaps are in open communication with the atmosphere through relief path 228. Refractory material is shown to be adjacent the outer surface of the outer radiation shield. The insulating spaces or air gaps can be of different sizes and shapes depending upon desired heat transfer. Passage 212 is aligned up with passage 221 to facilitate the flow of heat-softening glass material from a supply to a glass fiber forming housing.

It is apparent that, within the scope of the invention, modifications and different arrangements may be made other than as herein disclosed, and the present disclosure is illustrating merely the invention comprehending all variation thereof.

We claim:

1. A bushing block in combination with a glass fiber forming bushing comprising a wall defining a passage for accommodating flow of heat-softened mineral material from a supply into the bushing and insulating means comprising an insulating space surrounding the wall, a radiation shield surrounding the insulating space and insulating material surrounding the radiation shield.

2. The bushing block of claim 1 wherein the insulating space is filled with gas.

3. The bushing block of claim 1 wherein the insulating space is an evacuated space.

4. The bushing block of claim 1 wherein the radiation shield is surrounded by refractory material.

5. The bushing block of claim 1 comprises a plurality of insulating spaces and radiation shields.

6. The bushing block of claim 5 wherein the insulating spaces are not all of the same size.

7. The bushing block of claim 1 wherein the radiation shield is of a platinum-rhodium alloy.

8. The bushing block of claim 1 wherein the wall is of a ceramic material.

9. The bushing block of claim 1 wherein the wall defines a passage of cylindrical configuration.

10. The bushing block of claim 1 wherein the wall defines a passage having a rectangular cross-sectional configuration.

11. Apparatus for processing heat-softened glass fiber-forming material comprising means containing a supply of heat-softened material, a bushing disposed adjacent said means, a bushing block disposed between the bushing and the supply of heat-softened material, the bushing having orifices through which streams of material are discharged, said bushing block comprising a wall defining a passage for accommodating flow of heat-softened material from the supply into the bushing and insulating means comprising an insulating space surrounding the wall, a radiation shield surrounding the insulating space and insulating material surrounding the radiation shield.

12. The apparatus of claim 11 wherein the insulating space is filled with gas.

13. The apparatus of claim 11 wherein the radiation shield is surrounding by refractory material.

14. The apparatus of claim 11 with a plurality of insulating spaces and radiation shields.

15. The apparatus of claim 11 wherein the radiation shield is of a platinum-rhodium alloy.

16. Apparatus for processing heat-softened glass comprising a forehearth containing glass from a melting furnace, said forehearth comprising a flow block comprising a wall defining a glass flow passage, a bushing disposed adjacent the flow block having orifices through which flow streams of glass, a bushing block disposed between the flow block and the bushing, the bushing block comprising a wall defining a glass flow passage in registration with the flow passage in the flow block, the flow passages providing a channel for conveying glass from the forehearth into the bushing, the bushing block further comprising insulating means comprising an insulating space surrounding the wall, a radiation shield surrounding the space and insulating material surrounding the radiation shield.

17. The apparatus of claim 16 wherein the radiation shield is surrounded by refractory material.

18. The apparatus of claim 16 with a plurality of insulating spaces and radiation shields.

19. The apparatus of claim 16 wherein the flow block comprises insulating means comprising an insulating space surrounding the wall defining the flow block glass flow passage and a radiation shield surrounding said insulating space.

* * * * *

UNITED STATES PATENT AND TRADEMARK OFFICE
CERTIFICATE OF CORRECTION

PATENT NO. : 4,249,398
DATED : February 10, 1981
INVENTOR(S) : Neil E. Greene and Seshadri Srinivasan It is certified that error appears in the above—identified patent and that said Letters Patent is hereby corrected as shown below:

Column 1, line 27 should read:

shaped opening or passage elongated lengthwise of the

Column 5, line 26 should read:

insulating space 216 surrounds radiation shield 215, and

Column 5, line 44 should read:

from a supply to a glass fiber forming bushing.

Signed and Sealed this

Eighteenth Day of August 1981

[SEAL]

Attest:

Attesting Officer

GERALD J. MOSSINGHOFF
Commissioner of Patents and Trademarks